United States Patent
Gillis et al.

(10) Patent No.: US 6,416,080 B1
(45) Date of Patent: Jul. 9, 2002

(54) APPARATUS AND METHOD FOR PROTECTING A VEHICLE OCCUPANT UTILIZING A CORRELATION BETWEEN AN OCCUPANT-ASSOCIATED CENTER AND A DISTANCE TO AN OCCUPANT-ASSOCIATED SURFACE

(75) Inventors: Edward J. Gillis, South Lyon; Stephen R. W. Cooper, Fowlerville; Chek-Peng Foo, Ann Arbor, all of MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/679,327

(22) Filed: Oct. 4, 2000

(51) Int. Cl.[7] ............................................... B60R 21/32
(52) U.S. Cl. ..................................................... 280/735
(58) Field of Search ................................. 280/735, 734; 180/271, 273; 701/45

(56) References Cited

U.S. PATENT DOCUMENTS

| | | | |
|---|---|---|---|
| 5,074,583 A | | 12/1991 | Fujita et al. |
| 5,232,243 A | | 8/1993 | Blackburn et al. |
| 5,330,226 A | * | 7/1994 | Gentry et al. ............... 280/735 |
| 5,398,185 A | | 3/1995 | Omura |
| 5,413,378 A | | 5/1995 | Steffens, Jr. et al. |
| 5,454,591 A | | 10/1995 | Mazur et al. |
| 5,482,314 A | | 1/1996 | Corrado et al. |
| 5,573,269 A | | 11/1996 | Gentry et al. |
| 5,670,853 A | * | 9/1997 | Bauer .......................... 318/286 |
| 5,739,757 A | | 4/1998 | Gioutsos |
| 5,785,347 A | | 7/1998 | Adolph et al. |
| 5,821,633 A | | 10/1998 | Burke et al. |
| 5,868,423 A | | 2/1999 | Takimoto et al. |
| 5,871,232 A | * | 2/1999 | White .......................... 280/735 |
| 5,900,677 A | * | 5/1999 | Musiol et al. .............. 307/10.1 |
| 5,906,393 A | | 5/1999 | Mazur et al. |
| 6,007,095 A | * | 12/1999 | Stanley ........................ 280/735 |
| 6,070,115 A | * | 5/2000 | Oestreicher et al. ........... 701/45 |
| 6,094,610 A | * | 7/2000 | Steffens, Jr. et al. .......... 701/45 |
| 6,168,198 B1 | * | 1/2001 | Breed et al. ................. 280/735 |
| 6,203,059 B1 | * | 3/2001 | Mazur et al. ................ 280/735 |
| 6,282,473 B1 | * | 8/2001 | Steffens, Jr. ................. 280/735 |

OTHER PUBLICATIONS

U.S. Cooper et al. Patent Application Ser. No. 09/687,707, filed Oct. 13, 2000, entitled Vehicle Crash Determination Arrangement and Method, Utilizing Center of Gravity, for an Occupant Protection System.

* cited by examiner

Primary Examiner—Brian L. Johnson
Assistant Examiner—Faye M. Fleming
(74) Attorney, Agent, or Firm—Tarolli, Sundheim, Covell, Tummino & Szabo L.L.P.

(57) ABSTRACT

A system (10) protects a vehicle occupant. The system (10) includes an occupant protection device (24). A weight sensor (72) senses a weight value associated with an occupant (14). A portion (80) of a controller (34) determines a weight-based center characteristic (e.g., a center of gravity) associated with the occupant (14) using the sensed weight value. A distance sensor (e.g., 50) senses a distance to a surface associated with the occupant (14). A portion (46) of the controller (34) controls the protection device (24) utilizing the determined center characteristic and the sensed distance. The portion (46) of the controller (46) determines whether the sensed distance is to a surface of a head/thorax/torso of the occupant (14) utilizing the determined center characteristic.

23 Claims, 5 Drawing Sheets

APPARATUS AND METHOD FOR PROTECTING A VEHICLE OCCUPANT UTILIZING A CORRELATION BETWEEN AN OCCUPANT-ASSOCIATED CENTER AND A DISTANCE TO AN OCCUPANT-ASSOCIATED SURFACE

TECHNICAL FIELD

The present invention relates to a vehicle occupant protection system, and is particularly directed to a system that includes a weight sensor and a distance sensor.

BACKGROUND OF THE INVENTION

Occupant protection systems for use in vehicles are known in the art. One protection system type includes an actuatable inflatable restraint module, which has an inflatable restraint that is commonly referred to as an air bag. A controller determines whether the restraint module is to be actuated to inflate the air bag within a vehicle passenger compartment. The restraint module is actuated by the controller upon the occurrence of a predetermined condition for which a vehicle occupant is to be restrained. For example, the restraint module is actuated when a crash sensor that is operatively connected to the controller senses a vehicle condition indicative of a vehicle crash condition.

Protection system devices, such as an inflatable restraint module, that have one or more adjustable aspect(s) to enhance protection device performance are also known. Adjustment (i.e., control) of the adjustable aspect(s) is based upon one or more sensed condition(s). Such a protection device that is a restraint module is commonly referred to as a "smart restraint."

For example, in a known inflatable restraint modules the dynamic deployment profile of the air bag is adjustable. Specifically, with regard air bag deployment profile it is known to adjust the inflation timing, the inflation pressure, and the positioning of the inflating air bag. Further, suppression of actuation of the air bag is also an adjustable aspect.

Often, adjustment of the protection system device is based upon one or more sensed occupant condition(s). For example, adjustment of the dynamic deployment profile (e.g., inflation timing, inflation pressure, or complete suppression) of an air bag is controlled based upon a position or location of an associated occupant at the time of a vehicle crash condition. It is also known to control the dynamic deployment profile of an air bag based upon occupant size (e.g., large versus small) and occupant type (e.g., adult versus child).

Various types of occupant characteristic sensors are known to sense occupant characteristics such that appropriate determinations can be made with regard to control of a protection system device. For example, distance or ranging sensors are used to sense distance to a surface associated with the occupant. Using geometry, the location of the occupant is related to a structure within the vehicle, such as a distance between an air bag module and the occupant.

With regard to air bag modules, it is known to "de-power" actuation of an air bag module or to completely suppress actuation of the module if a head/thorax/torso of an associated vehicle occupant is located such that a full power actuation of the module will not enhance protection of the occupant. Thus, distance measurements/calculations are typically desired to be related the head/thorax/torso of an associated vehicle occupant to the air bag module.

Known distance sensors include ultrasonic, infrared, and capacitive-based sensors. However, certain conditions may cause difficulty for the distance sensor in making an accurate distance measurement to the head/thorax/torso of the occupant. For example, an ultrasound or infrared sensor may perceive a distance to a hand/arm of an occupant, a book, a newspaper, or the like that is located between the distance sensor and the head/thorax/torso of the occupant. Also, heavy clothing may cause difficulty for making an accurate distance determination for systems that have an ultrasound or infrared sensor. With regard to a capacitive-based distance sensor, a hand/arm of an occupant could cause difficulty in making an accurate distance determination.

Weight sensing of the occupant is useful to provide information regarding the presence, size, and type of the occupant. However, such determinations do not remedy the difficulty in making accurate distance determinations.

SUMMARY OF THE INVENTION

In accordance with one aspect, the present invention provides a vehicle occupant protection system. The system includes an occupant protection device. Means senses a weight value associated with an occupant. Means determines a weight-based center characteristic associated with the occupant using the sensed weight value. Means senses a distance to a surface associated with the occupant. Control means controls the protection device utilizing the determined center characteristic and the sensed distance. The control means includes means for determining whether the sensed distance is to a surface of a head/thorax/torso of the occupant utilizing the determined center characteristic.

In accordance with another aspect, the present provides a vehicle occupant protection system. The system includes an occupant protection device. A plurality of weight sensors of the system are associated with a vehicle seat. Each sensor senses a weight value associated with an occupant located on the seat. Means of the system determines center of gravity associated with the occupant using the sensed weight values. Means senses a distance to a surface associated with the occupant. Control means controls the protection device. The control means includes means for determining control of the protection device utilizing the determined center of gravity and the sensed distance.

In accordance with another aspect, the present provides a method of protecting a vehicle occupant. A weight value associated with an occupant is sensed. A weight-based center characteristic associated with the occupant is determined using the sensed weight value. A distance to a surface associated with the occupant is sensed. An occupant protection device is controlled utilizing the determined center characteristic and the sensed distance. The control includes determining whether the sensed distance is to a surface of a head/thorax/torso of the occupant utilizing the determined center characteristic.

BRIEF DESCRIPTION OF THE DRAWINGS

The foregoing and other features and advantages of the present invention will become apparent to those skilled in the art to which the present invention relates upon reading the following description with reference to the accompanying drawings, wherein.

DESCRIPTION OF PREFERRED EMBODIMENTS

Figure 1:
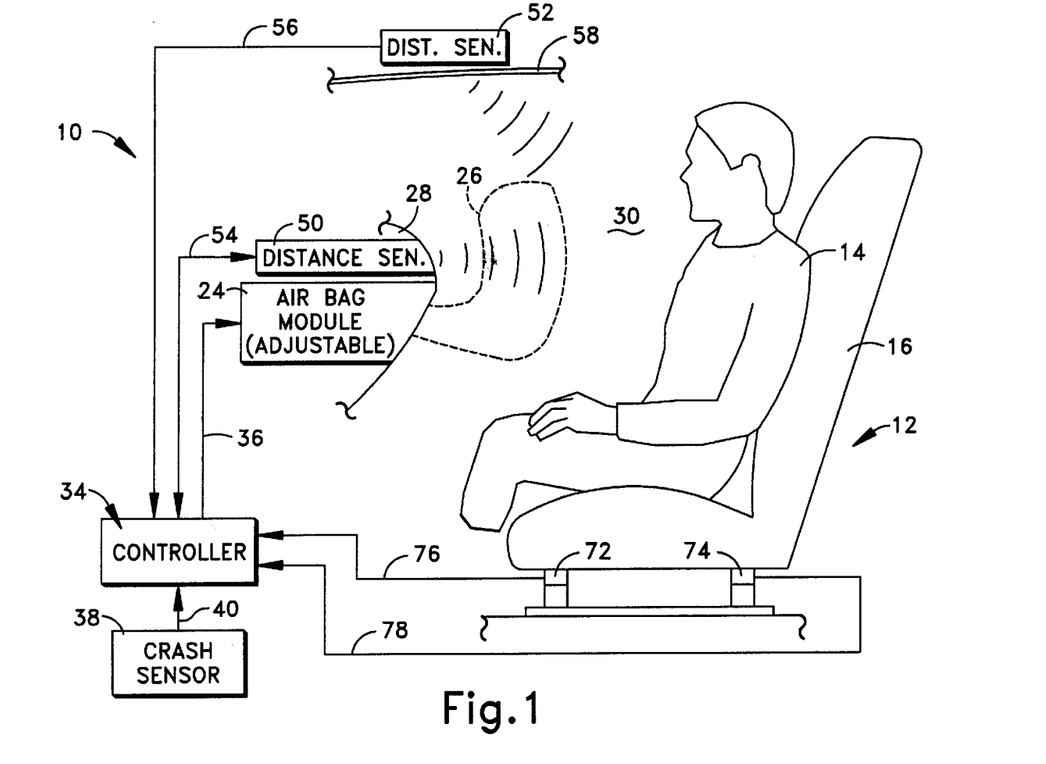
FIG. 1 is a schematic illustration of an occupant protection system incorporating the present invention, and a portion of an associated vehicle.

An occupant protection system 10, in accordance with the present invention, and an associated vehicle 12 are schematically illustrated in FIG. 1. The system 10 is provided for an occupant 14 (e.g., a front seat passenger) seated on a vehicle seat 16 within the vehicle 12.

The system 10 includes an actuatable occupant protection device 24. For the purpose of illustration of the invention and not for the purpose of limitation, the specific example of the protection device 24 is an air bag module. The module 24 includes an inflatable cushion restraint 26 that is commonly referred to as an air bag. The air bag 26 is stored in a folded condition within the module 24 in a manner well known in the art.

A source (not shown) of inflation fluid (e.g., nitrogen gas) is provided within the air bag module 24 to inflate the associated air bag 26. The source of inflation fluid is commonly referred to as an inflator, and includes a stored quantity of pressurized inflation fluid and/or an inflation fluid generating material. The inflator has an associated igniter (not shown, e.g., a pyrotechnic squib) that is electrically activated to initiate flow of the inflation fluid from the inflator. The air bag module 24 is located within a dashboard or instrument panel 28 of the vehicle 12. The flow of inflation fluid to the air bag 26 inflates the air bag within an occupant compartment 30 of the vehicle 12, as will be appreciated by a person of ordinary skill in the art.

The air bag module 24 has at least one adjustable aspect that is controllable to adjust actuation of the air bag. For example, the dynamic profile of the air bag 26 is adjusted. Examples of deployment adjustment include adjustment of inflation timing, adjustment of inflation pressure, and adjustment of location of the inflated air bag relative to the occupant 14. It is to be appreciated that suppression of actuation of the air bag module 24 may also be the adjustable aspect.

A specific example of adjustment to inflation timing is selection of a time period between a determination to actuate the air bag module and an initiation of air bag inflation. A specific example of adjustment of inflation pressure is selection of a pressure threshold for a pressure release valve that vents the air bag. A specific example of adjustment of air bag positioning is selection of a location relative to the occupant for placement of the inflated air bag. Positioning is accomplished by directing inflation fluid into the air bag in predetermined zones within the air bag or by re-pointing the entire air bag module via moving devices. Another specific example of adjustment of air bag positioning is moving the entire air bag module toward or away from the occupant and/or moving the occupant toward or away from the air bag module.

Although the illustrated example is set forth with an air bag module 24, it is to be understood that the system may include other and/or different occupant protection device(s) located elsewhere within the vehicle. Examples of different/additional actuatable protection system devices include a knee bolster module, a side curtain module, a lockable seat belt module, a seat belt pretensioner module, and a D-ring adjuster module. A person of ordinary skill in the art will appreciate that the actuatable protection system devices may also have adjustable actuation variable(s). Such adjustable variables include actuation suppression, deployment timing, dynamic profile, etc.

Turning to the illustrated example, control of the air bag module is by a controller 34 that provides control signal(s) 36 to the air bag module 24. Specifically, the controller 34 provides the signal(s) 36 to the air bag module 24 to cause adjustment/actuation of the air bag module. In one example, the controller 34 is a microcomputer that includes a processor that performs a plurality of procedures. The controller 34 receives sensory input from several sources and, using the sensory input, makes determinations regarding control.

One of the sensory input sources for the controller 34 is a sensor 38 that senses a vehicle condition for which the occupant 14 is to be protected via actuation of the air bag module 24, and provides a signal 40 to the controller indicative of the sensed vehicle condition. In the illustrated example, the sensor 38 is a crash sensor that senses a condition indicative of a vehicle crash. Preferably, the crash sensor 38 is an accelerometer, and the signal 40 is an electrical signal having a characteristic indicative of the sensed deceleration (e.g., voltage, frequency, etc.).

The controller 34 (FIG. 2) includes a portion 42 that processes the deceleration information derived from the signal 40, and determines whether the sensed deceleration is indicative of a vehicle crash. As an example, the crash determination portion 42 determines if the sensed deceleration exceeds a predetermined threshold value. Upon a determination that the sensed deceleration is indicative of a vehicle crash, the crash determination portion 42 outputs a signal 44 to an adjust and actuation control portion 46 of the controller 34.

Another sensory input source for the controller 34 is a distance sensor for determining a distance from the respective sensor to a surface associated with the occupant 14. In the illustrated example, there are a plurality (two) of distance sensors 50 and 52. Each of the distance sensors 50, 52 is operatively connected 54, 56, respectively, to the controller 34. The first distance sensor 50 is located in the instrument panel 28, adjacent to the air bag module; 24, and the second distance sensor 52 is located in a headliner 58 of the vehicle 12.

Several known types of distance sensors may be utilized within the system 10. Examples of such sensors include ultrasonic sensors, infrared sensors, and capacitive-type sensors. In the illustrated example, the distance sensors 50 and 52 are ultrasonic sensors.

The general operation of each ultrasonic sensor (e.g., the first distance sensor 50) is as follows. The controller provides a stimulus to the distance sensor 50. In response to the stimulus from the controller 34, the distance sensor 50 emits an ultrasonic signal (e.g., a "ping"). The ultrasonic signal travels through the air and impinges upon a surface (e.g., a surface of the head/thorax/torso) associated with the occupant 14. The signal is reflected, and the reflected signal is often referred to as an echo. The echo impinges upon the distance sensor 50 and is thus received at the sensor. In response to receipt of the return echo, the distance sensor 50 provides a signal to the controller 34.

The time between emission of the ultrasonic signal and receipt of the return echo is indicative of the distance (see FIG. 3 for an example D1) between the distance sensor 50 and the surface associated with the occupant 14. The time difference is often referred to as "time-of-flight" and is related to the distance based upon the propagation rate for the ultrasound signal through air. The controller 34 (FIG. 2) includes a distance determination(s) portion 62 that computes distance via the use of the time of flight. The distance determination(s) portion is operatively connected 64 to the adjust and actuation control portion 46 to convey the determined distance information.

Turing to a relationship between the determined distance, the air bag module 24, the occupant 14, the location of each distance sensor (e.g., 50) relative to the air bag module 24 is known. Accordingly, via the use of simple geometric relationships, the distance to the occupant-associated surface relative to the air bag module 24 is determined. In pertinent part, the determined distance to the occupant-associated surface relative to the air bag module is used to determine if the head/thorax/torso of the occupant 14 is located within an occupant out-of-position ("OOP") zone 66 (FIG. 3) that is defined by an OOP zone boundary 68 located at certain distance from the air bag module 24. Such a determination is made within the adjust and actuation control portion 46 (FIG. 2) of the controller 34.

Deployment of the air bag module 24 for an occupant 14' (FIG. 4) who has a head/thorax/torso located near or within an OOP zone 66 will not enhance protection of the occupant. Thus, deployment of the air bag module 24 is substantially attenuated or suppressed when a head/thorax/torso of the occupant 14 is located near or within the OOP zone 66.

Another input source for the controller 34 (FIG. 1) is at least one sensor that provides an occupant-based weight value that is utilized to make a determination regarding a weight-based center characteristic associated with the occupant 14. In the embodiment illustrated in FIG. 1, the weight-related input source includes a plurality (e.g., two) of weight sensors 72 and 74. Each of the weight sensors 72, 74 is located beneath the seat 16 (e.g., between the seat and the associated support structure).

The first weight sensor 72 is located beneath a forward portion of the seat 16 and is referred to as a front weight sensor 72. The second weight sensor 74 is located beneath a rearward portion of the seat 16 and is referred to as the rear weight sensor 74. The weight sensors 72 and 74 output signals 76 and 78, respectively, that are indicative of sensed weight values. The weight sensors 72 and 74 may be any known type such as strain gauge, force sensitive, variable reluctance, or capacitive. In one embodiment, the weight sensors 72 and 74 may be of the type utilized for occupant presence/position sensing arrangements.

The controller 34 (FIG. 2) includes a portion 80 that utilizes the signals 76 and 78 provided by the weight sensors 72 and 74 to determine a location of a weight-based center characteristic associated with the occupant 14. The weight-based center location determination portion 80 is operatively connected 82 to the adjust and actuation control portion 46 of the controller, and the determined location of the weight-based center characteristic associated with the occupant 14 is provided to the adjust and actuation control portion.

In the illustrated example, the weight-based center location determination portion 80 determines a location of a center of gravity (C.O.G.) of the occupant 14 and the seat 16 (hereinafter referred to as the combined C.O.G. of the occupant and the seat). See FIG. 3 for an example of the combined C.O.G. location. Also, in the illustrated example, the location of the combined C.O.G. is represented as a distance L from the front weight sensor 72 along a fore-to-aft axis of the vehicle 12. It is to be appreciated that the location of the combined C.O.G. may be referenced to another point within the vehicle 12.

Figure 3:
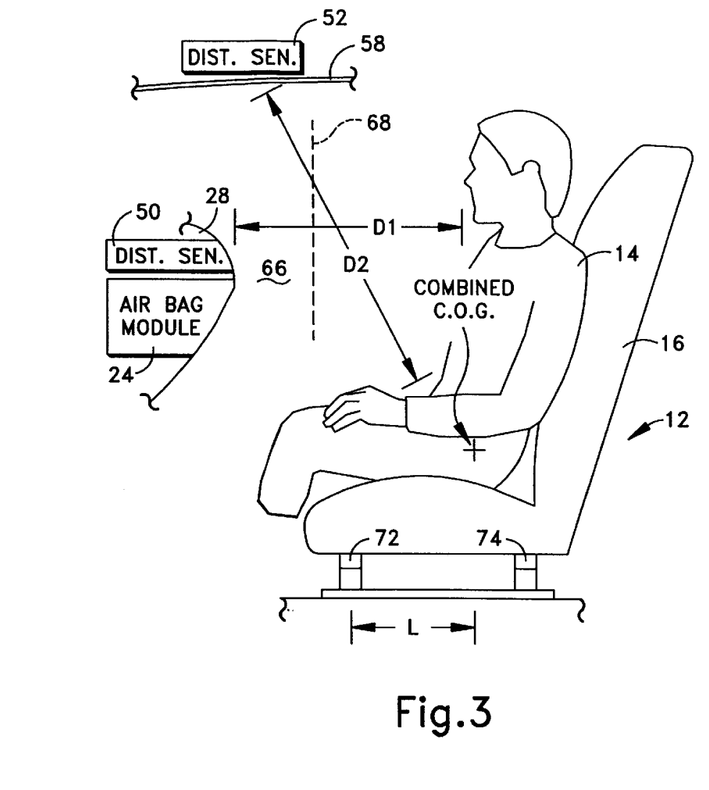
FIG. 3 is an illustration of a portion of the vehicle and the occupant showing first determined values.

If the only forces acting on the occupant 14 and the seat 16 are gravitational forces, then the position of a center of mass is easily calculated from the weights measured by the front and rear weight sensors 72 and 74. Since the seat 16 is, at least approximately, stationary relative to the vehicle 12, the torques on the seat must sum to zero. If the front weight sensor 72 is used as the pivot point, then the torque balance equation can be written as:

$$rS = mgL$$

where:

r is the weight measured by the rear sensor,

S is the separation between the front and the rear sensors, m is the mass, e.g., the combined mass of the occupant (the portion supported by the seat) and of the seat, g is the acceleration of gravity, and L is the (longitudinal) distance of the center of mass from the front weight sensor.

The weight equation is:

$$f + r = mg$$

where:

f is the weight on the front sensor.

From the known quantities, S and g, and the measured quantities, f and r, one can calculate the position (e.g., horizontal location) of the center of mass as:

$$L = rS/(f+r)$$

(Note, in this coordinate system, the positive longitudinal direction is toward the rear of the vehicle.)

In situations where other forces act on the seat 16, additional information is needed to compute the location of the center. For example, in 2 braking situation, horizontal inertial forces can be exerted on the occupant 14 and the seat 16, and the occupant 14 will tend to resist by pushing against the seat. Since the occupant's center of mass is typically above the weight sensors 72 and 74, an additional torque will be exerted on the seat 16 from the horizontal forces. The torque balance equation now becomes:

$$rS + maH = mgL$$

where:
 a is the horizontal acceleration, and
 H is the vertical distance of the center of mass of the occupant above the sensors.

The value of the vertical distance (H) can be estimated from the seat configuration and weight of the occupant, but the value of the horizontal acceleration (a) must be measured or inferred in some other manner. The most straightforward means of obtaining the value of the horizontal acceleration (a) is to measure it with a low g accelerometer, or wheel speed sensor (as might be available from an anti-lock braking system). When the horizontal acceleration (a) is measured, the location of the center can still be calculated as:

$$L=(rS/(f+r))+(aH/g).$$

Within the adjust and actuation control portion 46 all of the provided inputs are utilized to make determinations regarding adjustment and actuation control of the air bag module 24. Specifically, a determination is made as to whether a head/thorax/torso of the occupant 14 is located near or within the OOP zone 66.

The location of the combined C.O.G. is indicative of the location of the head/thorax/torso of the occupant. A change in location of the combined C.O.G. is indicative of a change in the location of the head/thorax/torso of the occupant 14. Thus, the information discerned from the determination and monitoring of the occupant-associated center (e.g., the combined C.O.G.) is utilized to make a determination as to whether the distance sensed by each distance sensor(s) 50, 52 is a distance to a head/thorax/torso of the occupant 14. Such a determination is made within the adjust and actuation control portion 46 of the controller 34.

It is possible for the distance sensed by a distance sensor (e.g., 50) to be to a surface associated with the occupant 14 that is not a surface on a head/thorax/torso of the occupant. One example is that the passenger occupant 14" is holding a newspaper 86 (FIG. 5) at a location which would cause the ultrasonic signal(s) from the distance sensor(s) (e.g., 50) to impinge upon, and be reflected by, the newspaper. The surface of the newspaper 86 being held by the occupant 14 (i.e., and thus associated with the occupant), may be located within the OOP zone 66. Another example (not shown) is that an arm/hand of the occupant 14 is held up at a location that would cause the ultrasonic signal(s) from the distance sensor(s) (e.g., 50) to impinge upon, and be reflected by, the arm/hand.

Figure 4:
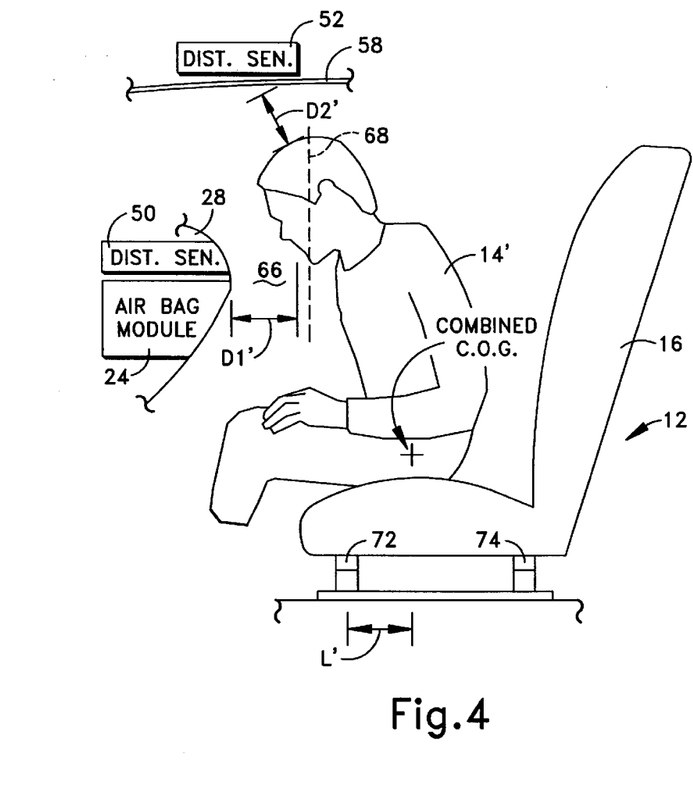
FIG. 4 is a view similar to FIG. 3, but with the occupant in a different position and different determined values.
Figure 5:
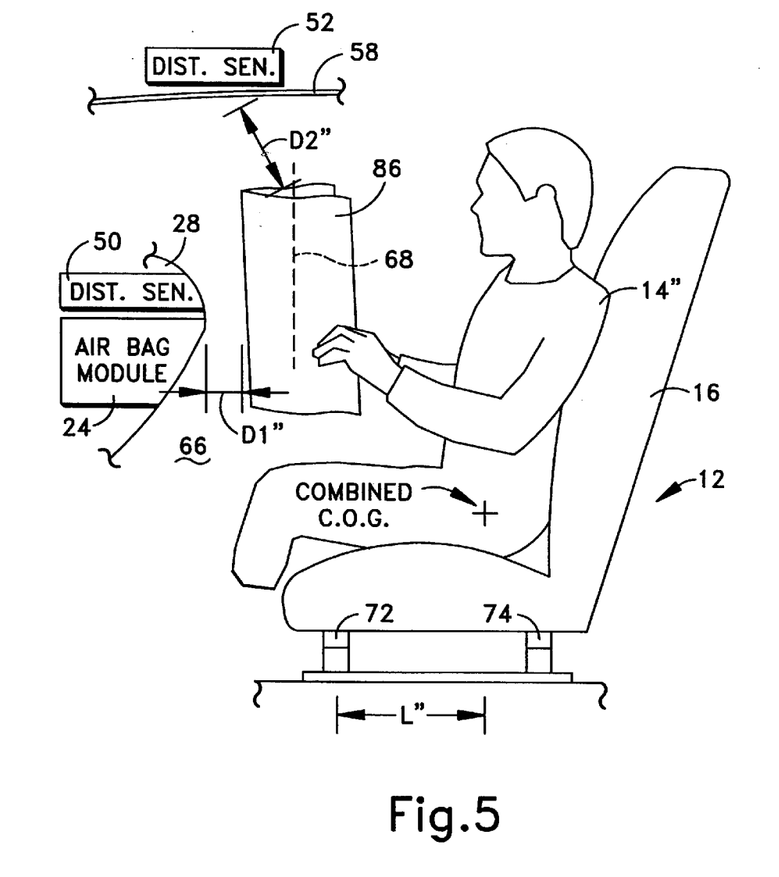
FIG. 5 is a view similar to FIG. 3, but with the occupant in another different position and different determined values.

The use of the weight-based center (e.g., the combined G.O.G.) associated with the occupant 14 to determine whether the distance sensed by a distance sensor (e.g., the first distance sensor 50) is to the head/thorax/torso of the occupant 14 is easily understood upon a comparison of FIGS. 3–5. Within FIG. 3, the distance between the first distance sensor 50 and the head/thorax/torso of the occupant 14 is D1, the distance between the second distance sensor 52 and the head/thorax/torso of the occupant is D2, and the location of the combined C.O.G. is at a distance L from the front weight sensor 72. The occupant 14 is located well outside of the OOP zone 66. But more importantly, there is a correlation or correspondence among the information provided via distance sensing and weight-based center information. In other words, both forms of information indicate that the location of the head/thorax/torso of the occupant 14 is outside the OOP zone 66.

Within FIG. 4, the distance between the first distance sensor and the head/thorax/torso of the occupant 14' is D1', the distance between the second distance sensor and the head/thorax/torso of the occupant is D2', and the location of the combined C.O.G. is at a distance L' from the front weight sensor 72. The distance D1' is much shorter than the distance D1 (FIG. 3), the distance D2' (FIG. 4) is much shorter than the distance D2' (FIG. 3), and the distance L' (FIG. 4) is much shorter than the distance L because the occupant 14' shown in FIG. 4 is located at a shifted-forward position (e.g., the occupant in FIG. 4 is leaning toward the instrument panel 28).

The head/thorax/torso of the occupant 14' of FIG. 4 is located at the OOP zone boundary 68. But again more importantly, there is a correlation or correspondence among the information provided via distance sensing and weight-based center information. In other words, both forms of information indicate that the location of the head/thorax/torso of the occupant is at the OOP zone.

Within FIG. 5, the distance between the first distance sensor 50 and the head/thorax/torso of the occupant 14" is D1", the distance between the second distance sensor 52 and the head/thorax/torso of the occupant is D2", and the location of the combined C.O.G. is at a distance L" from the front weight sensor 72. The distance D1" is much shorter than the distance D1 (FIG. 3), but is close to the distance D1' (FIG. 4). The distance D2" (FIG. 5) is much shorter than the distance D2 (FIG. 3), but is close to the distance D2' (FIG. 4). The distance L" (FIG. 5) is close to the distance L (FIG. 3), but is much shorter than the distance L' (FIG. 4).

A correlation or correspondence does not exist between the distance sensing information and weight-based center information. In other words, the information is contradictory. The contradiction exists because of the presence of the newspaper 86. It is noted that the location of the weight-base center for the occupant 14" holding the newspaper (FIG. 5) does not differ appreciably from the location of the weight-base center of the occupant 14 (FIG. 3) seated well away from the OOP zone 66. Thus, control of the air bag module 24, as provided by the adjust and actuation control portion 46, is similar for the scenarios of FIGS. 3 and 5. However, the control of the air bag module 24 for the scenario of FIG. 4 is different that the control for the scenarios of FIGS. 3 and 5.

The control that occurs for the scenario of FIG. 5 despite the conflicting information is due to an arbitration or discounting procedure performed within the adjust and actuation control portion 46. Specifically, the conflict between the information is a stimulus to further process the information. In one embodiment, the weight-based center characteristic is considered to be a reliable indication of the location of the head/thorax/torso of the occupant 14" and is used to discount the distance-based information. It is to be appreciated that a range of acceptance of correlation or correspondence between the distance-based information and the weight-based center information is utilized. Correlation is lacking and arbitration/discounting is needed only when the difference is greater than that the acceptable range.

Figure 2:
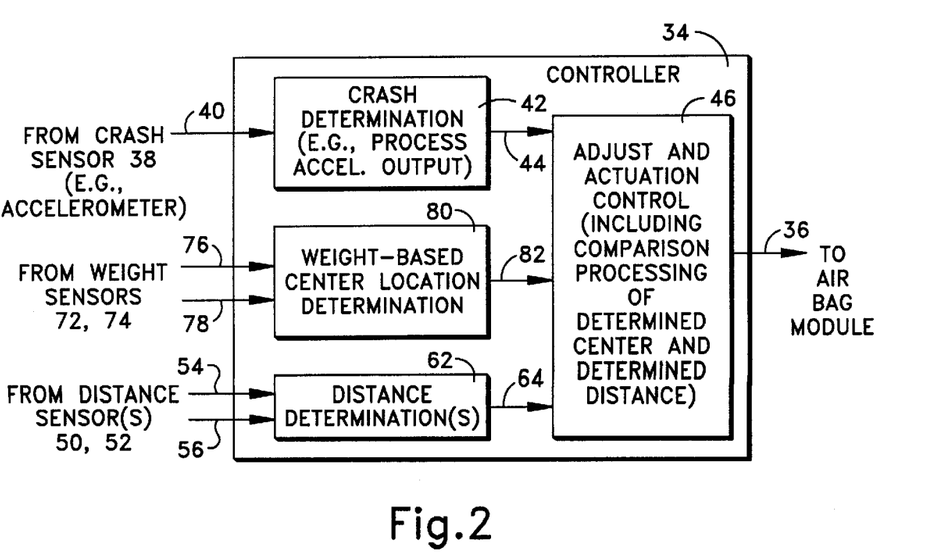
FIG. 2 is a function block diagram of portions of a controller shown in FIG. 1.
Figure 6:
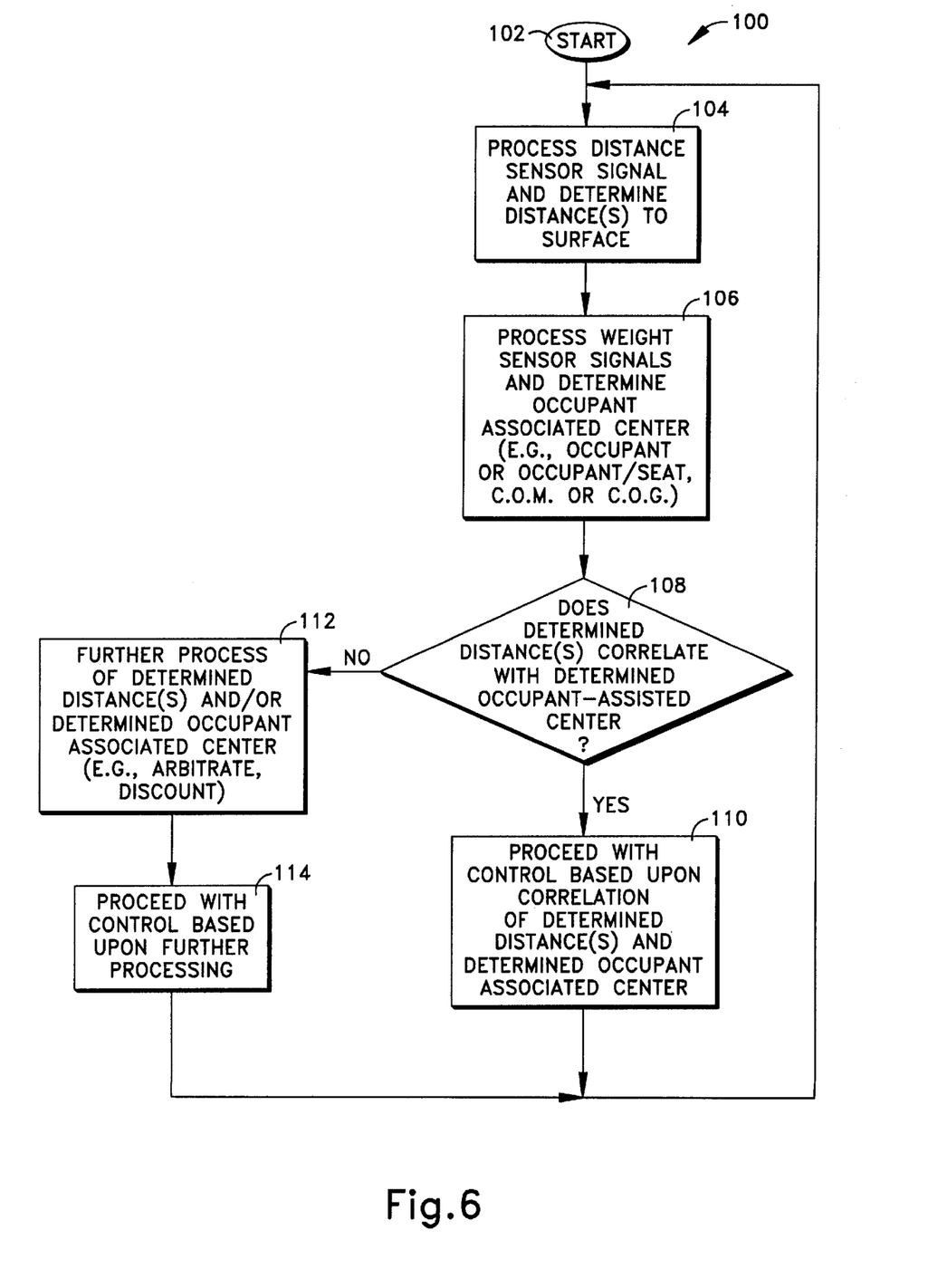
FIG. 6 is a flow chart for a process performed within the controller of FIG. 2.

A process 100 performed within the controller of FIG. 2 is shown in FIG. 6. The process 100 is initiated at step 102 and proceeds to step 104. At step 104, the sensory information provided by the distance sensor(s) is processed and determination(s) are made with regard to distance(s) to occupant-associated surface(s). At step 106, weight sensor signal information is processed and a determination is made regarding the location of the weight-based center characteristic associated with the occupant. For example, the location of the combined C.O.G. is determined.

At step 108, it is determined whether the distance information correlates to the determined weight-based center information. If the determination at step 108 is affirmative (i.e., there is a correlation between the distance information and the weight-based center information), then the process 100 proceeds to step 110. At step 110, control (i.e., the processing within the adjust and actuation control portion 46) proceeds based upon the correlation of the distance information and the weight-based center information.

If the determination at step 108 is negative (i.e., the distance information and the weight-based center information does not correlate), then the process 100 goes to step 112. At step 112, the adjust and actuation control portion 46 performs further processing of the distance information and the weight-based center information. Specifically, an arbitration or discounting between the non-correlated information is performed. Upon completion of step 112, the process 100 proceeds to step 114 in which control of the air bag (i.e., the processing within the adjust and actuation control portion 46) proceeds based upon the further processing. Upon completion of step 110, or step 114, the process 100 loops to step 104 to again make distance and weight determinations.

Figure 7:
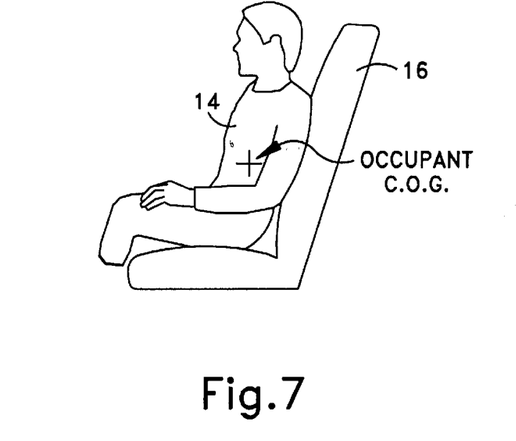
FIG. 7 is a view similar to FIG. 3, but with a different occupant-based center shown.
Figure 8:
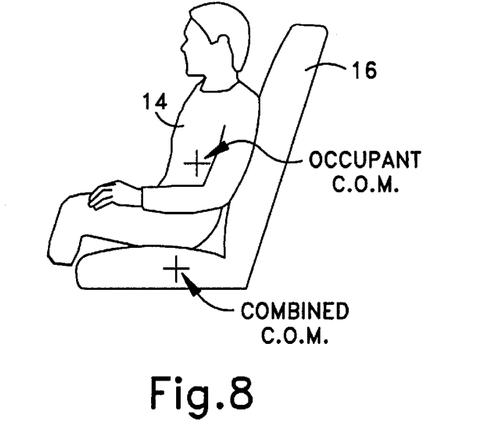
FIG. 8 is a view similar to FIG. 3, but with two other, different occupant-based centers shown.

The weight-based center can be a center other than the combined C.O.G. As shown in FIG. 7, the weight-based center can be a center of gravity (C.O.G.) of the occupant alone. Also, as shown in FIG. 8, the weight-based center can be a center of mass (C.O.M.) of the occupant alone or a combination of the occupant and the seat. It is to be appreciated that a change in the monitored center (e.g., the COM or the COG of the occupant or the combination of the occupant and the seat) is indicative of a change in the location of the head/thorax/torso. Thus, the information discerned from the determination and monitoring of the weight-based center associated with the occupant is utilized to make a determination as to whether the distance sensed by the distance sensors is indicative of the sensed distance being to a head/thorax/torso of the occupant.

Figure 9:
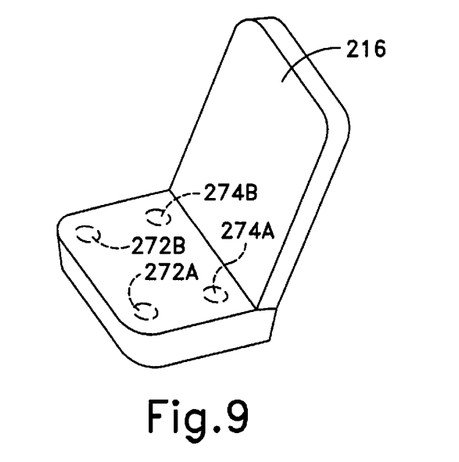
FIG. 9 is a plan view of a seat that contains components of a second embodiment in accordance with the present invention.

Also, it is to be appreciated that different weight sensor arrangements can be utilized for determining the weight-based center characteristic. In the embodiment of FIG. 9, four weight sensors 272A, 272B, 274A, and 274B are utilized in conjunction with a seat 216. Thus, location of a weight-based center is monitored along the fore-to-aft axis and the lateral axis of a vehicle. Such monitoring is useful in conjunction with a distance measurement that extends laterally.

Figure 10:
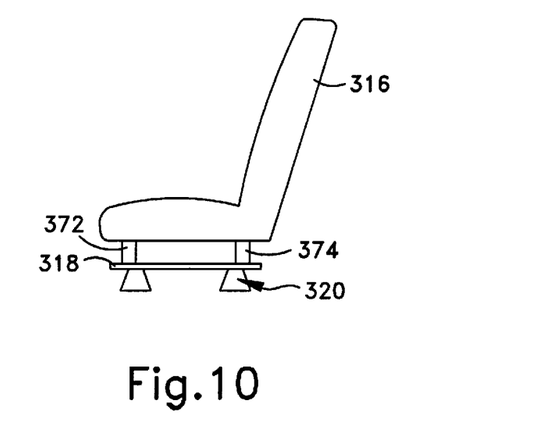
FIG. 10 is a side view of a seat that has associated components in accordance with a third embodiment of the present invention.
Figure 11:
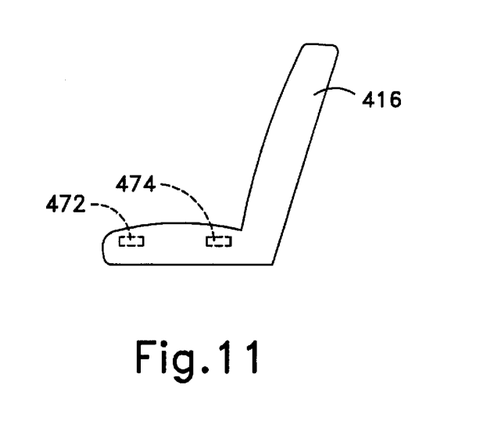
FIG. 11 is a side view of a seat that has components in accordance with a fourth embodiment of the present invention.

The embodiment of FIG. 10 illustrates the use of weight sensors 372 and 374 interposed between a seat 316 and a slide rail 318 of a seat mount 320. Such an arrangement is useful to determine a combined C.O.G. or C.O.M. of the occupant and the seat. The embodiment of FIG. 11 illustrates the use of weight sensors 472 and 474 within a seat 416. Such an arrangement is useful to determine the C.O.G. or C.O.M. of the occupant alone.

Figure 12:
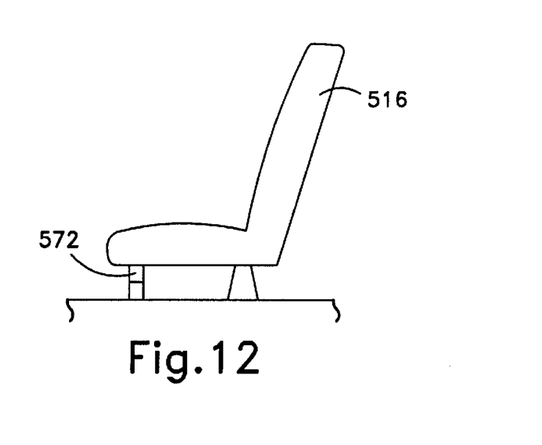
FIG. 12 is a side view of a seat that has associated components in accordance with a fifth embodiment of the present invention.

The embodiment of FIG. 12 illustrates the use of a single weight sensor 572. In the illustrated example, the single weight sensor 572 is beneath a front portion of a seat 516. Although the location of a weight-based center can not be precisely determined via use of a single weight sensor, movement of the center can be determined. Such movement of a weight-based center is also a weight-based center characteristic that is usable to determine whether a sensed distance is to a surface of a head/thorax/torso of an occupant.

From the above description of the invention, those skilled in the art will perceive improvements, changes and modifications. Such improvements, changes and modifications within the skill of the art are intended to be covered by the appended claims.

Having described the invention, the following is claimed:

1. A vehicle occupant protection system comprising:

an occupant protection device;

means for sensing a weight value associated with an occupant;

means for determining a weight-based center characteristic associated with the occupant using the sensed weight value;

means for sensing a distance to a surface associated with the occupant; and control means for controlling said protection device utilizing the determined center characteristic and the sensed distance, and including means for determining whether the sensed distance is to a surface of a head/thorax/torso of the occupant utilizing the determined center characteristic.

2. A system as set forth in claim 1, wherein said means for determining whether the sensed distance is to a surface of a head/thorax/torso includes means for determining if a correlation exists between the sensed distance and the determined weight-based center.

3. A system as set forth in claim 1, wherein the sensed weight value is a first weight value, said weight sensing means includes means for sensing a second weight value associated with the occupant, said means for determining a weight-based center characteristic uses the first and second weight values.

4. A system as set forth in claim 3, wherein said means for determining a weight-based center characteristic includes means for determining a center of gravity associated with the occupant.

5. A system as set forth in claim 1, wherein said means for determining a weight-based center characteristic includes means for determining a center of gravity associated with the occupant.

6. A system as set forth in claim 1, wherein said means for determining a weight-based center characteristic includes means responsive to horizontal acceleration.

7. A system as set forth in claim 1, wherein said means for sensing a distance to a surface associated with the occupant includes means for sensing the distance across a span of air space.

8. A system as set forth in claim 1, wherein said means for sensing a distance to a surface associated with the occupant includes means for transmitting a signal and receiving a reflection of the signal from the surface associated with the occupant.

9. A system as set forth in claim 8, wherein said means for transmitting a signal includes means for transmitting an ultrasonic signal.

10. A system as set forth in claim 8, wherein said means for transmitting a signal includes means for transmitting an infrared signal.

11. A system as set forth in claim 1, wherein said means for sensing a distance to a surface associated with the occupant includes a capacitive-type sensor.

12. A system as set forth in claim 1, wherein said means for sensing a distance to a surface associated with the occupant includes a distance sensor located at a vehicle instrument panel.

13. A system as set forth in claim 1, wherein said means for sensing a distance to a surface associated with the occupant includes a distance sensor adjacent to said occupant protection device.

14. A system as set forth in claim 1, wherein said means for determining whether the sensed distance is to a surface of a head/thorax/torso of the occupant includes means for determining whether the surface associated with the occupant is an object held by the occupant.

15. A method of protecting a vehicle occupant, said method comprising:

sensing a weight value associated with an occupant;

determining a weight-based center characteristic associated with the occupant using the sensed weight value;

sensing a distance to a surface associated with the occupant; and controlling an occupant protection device utilizing the determined center characteristic and the sensed distance, including determining whether the sensed distance is to a surface of a head/thorax/torso of the occupant utilizing the determined center characteristic.

16. A method as set forth in claim 15, wherein said step of determining whether the sensed distance is to a surface of a head/thorax/torso includes determining if a correlation exists between the sensed distance and the determined weight-based center.

17. A method as set forth in claim 15, including sensing a second weight value associated with the occupant, said step of determining a weight-based center characteristic includes using the first and second weight values.

18. A method as set forth in claim 17, wherein said step of determining a weight-based center characteristic includes determining a center of gravity associated with the occupant.

19. A method as set forth in claim 15, wherein said step of determining a weight-based center characteristic includes determining a center of gravity associated with the occupant.

20. A method as set forth in claim 15, wherein said step of determining a weight-based center characteristic includes determining responsive to horizontal acceleration.

21. A vehicle occupant protection system comprising:

an occupant protection device;

a plurality of weight sensors associated with a vehicle seat, each for sensing a weight value associated with an occupant located on the seat;

means for determining center of gravity associated with the occupant using the sensed weight values;

means for sensing a distance to a surface associated with the occupant; and control means for controlling said protection device, including means for determining control of said protection device utilizing the determined center of gravity and the sensed distance, said means for determining control including means for determining whether the sensed distance is to a surface of a torso/head/thorax of the occupant utilizing the determined center of gravity.

22. A system as set forth in claim 21, wherein said means for determining whether the sensed distance is to a surface of a head/thorax/torso includes means for determining if a correlation exists between the sensed distance and the determined weight-based center.

23. A vehicle occupant protection system comprising:

an occupant protection device;

a plurality of weight sensors associated with a vehicle seat, each for sensing a weight value associated with an occupant located on the seat;

means for determining center of gravity associated with the occupant using the sensed weight values;

means for sensing a distance to a surface associated with the occupant; and control means for controlling said protection device, including means for determining control of said protection device utilizing the determined center of gravity and the sensed distance, wherein said means for determining center of gravity includes means responsive to horizontal acceleration.

\* \* \* \* \*